US011635032B2

(12) United States Patent
Meunier (10) Patent No.: US 11,635,032 B2
(45) Date of Patent: Apr. 25, 2023

(54) SYSTEM AND METHOD FOR PROPELLER SPEED GOVERNING

(71) Applicant: PRATT & WHITNEY CANADA CORP., Longueuil (CA)

(72) Inventor: Gabriel Meunier, Saint-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 564 days.

(21) Appl. No.: 16/713,439

(22) Filed: Dec. 13, 2019

(65) Prior Publication Data
US 2021/0180525 A1    Jun. 17, 2021

(51) Int. Cl.
| F02C 9/58 | (2006.01) |
| F02D 29/02 | (2006.01) |
| B64F 5/60 | (2017.01) |
| B64C 11/00 | (2006.01) |
| B64D 27/10 | (2006.01) |
| B64D 31/06 | (2006.01) |

(52) U.S. Cl.
CPC ............... F02C 9/58 (2013.01); B64C 11/00 (2013.01); B64D 27/10 (2013.01); B64D 31/06 (2013.01); B64F 5/60 (2017.01); F02D 29/02 (2013.01)

(58) Field of Classification Search
CPC . F02D 29/02; F02C 9/58; B64C 11/30; B64C 11/305; B64C 11/44; B64D 11/06
See application file for complete search history.

(56) References Cited

U.S. PATENT DOCUMENTS

| 4,958,289 | A |  | 9/1990 | Sum et al. |
| 5,023,793 | A |  | 6/1991 | Schneider et al. |
| 5,209,640 | A | * | 5/1993 | Moriya ................... B64C 11/40 |
|  |  |  |  | 416/37 |
| 9,745,051 | B2 | * | 8/2017 | Tantot ..................... B64D 31/06 |
| 2015/0314853 | A1 |  | 11/2015 | Tantot et al. |
| 2019/0003642 | A1 |  | 1/2019 | Pedrami et al. |
| 2020/0088112 | A1 | * | 3/2020 | Tang ....................... B64C 11/301 |
| 2020/0115037 | A1 | * | 4/2020 | Lamarre ................ B64C 11/385 |
| 2020/0283124 | A1 | * | 9/2020 | Zakucia ................. B64C 11/303 |

OTHER PUBLICATIONS

Extended European Search Report dated May 11, 2021 in counterpart EP application.

* cited by examiner

*Primary Examiner* — John Kwon
*Assistant Examiner* — Johnny H Hoang
(74) *Attorney, Agent, or Firm* — Norton Rose Fulbright Canada LLP (57) ABSTRACT

Systems and methods are described for governing the speed of a propeller on a propeller-based engine in an aircraft. The method comprises obtaining a synthesized or estimated blade angle for the propeller of the engine, determining one or more gain for a controller of the propeller based on the synthesized or estimated blade angle and one or more engine or aircraft parameter, determining a difference between a reference propeller speed and an actual propeller speed, applying the one or more gain to the difference via the controller in order to generate a command signal for controlling the propeller, and governing the propeller of the engine using the command signal.

20 Claims, 6 Drawing Sheets

SYSTEM AND METHOD FOR PROPELLER SPEED GOVERNING

TECHNICAL FIELD

The present disclosure relates generally to gas turbine engines, and more particularly to governing the speed of a propeller on a propeller-based engine.

BACKGROUND OF THE ART

For certain propeller-based engines, a measured propeller blade angle is used in the propeller governing scheme. Smaller turboprop engines do not have this feature. In addition, certain control architectures for larger propeller-based engines do not allow a reading or feedback of the blade angle when the propeller operates in forward pitch (i.e. forward operation).

Therefore, improvements are needed.

SUMMARY

In accordance with a broad aspect, there is provided a method for governing the speed of a propeller on a propeller-based engine in an aircraft. The method comprises obtaining a synthesized or estimated blade angle for the propeller of the engine, determining one or more gain for a controller of the propeller based on the synthesized or estimated blade angle and one or more engine or aircraft parameter, determining a difference between a reference propeller speed and an actual propeller speed, applying the one or more gain to the difference via the controller in order to generate a command signal for controlling the propeller, and governing the propeller of the engine using the command signal.

In accordance with another broad aspect, there is provided a system for governing the speed of a propeller on a propeller-based engine in an aircraft. The system comprises a processing unit and a non-transitory computer readable medium having stored thereon program code. The program code is executable by the processing unit for obtaining a synthesized or estimated blade angle for the propeller of the engine, determining one or more gain for a controller of the propeller based on the synthesized or estimated blade angle and one or more engine or aircraft parameter, determining a difference between a reference propeller speed and an actual propeller speed, applying the one or more gain to the difference via the controller in order to generate a command signal for controlling the propeller, and governing the propeller of the engine using the command signal.

In accordance with yet another broad aspect, there is provided a non-transitory computer-readable medium having stored thereon program instructions executable by a processor for governing the speed of a propeller on a propeller-based engine in an aircraft. The program instructions are configured for obtaining a synthesized or estimated blade angle for the propeller of the engine, determining one or more gain for a controller of the propeller based on the synthesized or estimated blade angle and one or more engine or aircraft parameter, determining a difference between a reference propeller speed and an actual propeller speed, applying the one or more gain to the difference via the controller in order to generate a command signal for controlling the propeller, and governing the propeller of the engine using the command signal.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for governing the speed of a propeller on a propeller-based engine in an aircraft. A control structure for propeller speed governing relies on a synthesized or estimated blade angle to set the gain(s) of a feedback controller when a measured blade angle is unavailable. Propeller characteristics may be used to generate the synthesized or estimated blade angle. Although the examples illustrated herein show a turboprop engine, it will be understood that the methods and systems for propeller speed governing may be applied to other propeller-based engines, such as piston engines, electrical engines, and the like.

Figure 1:
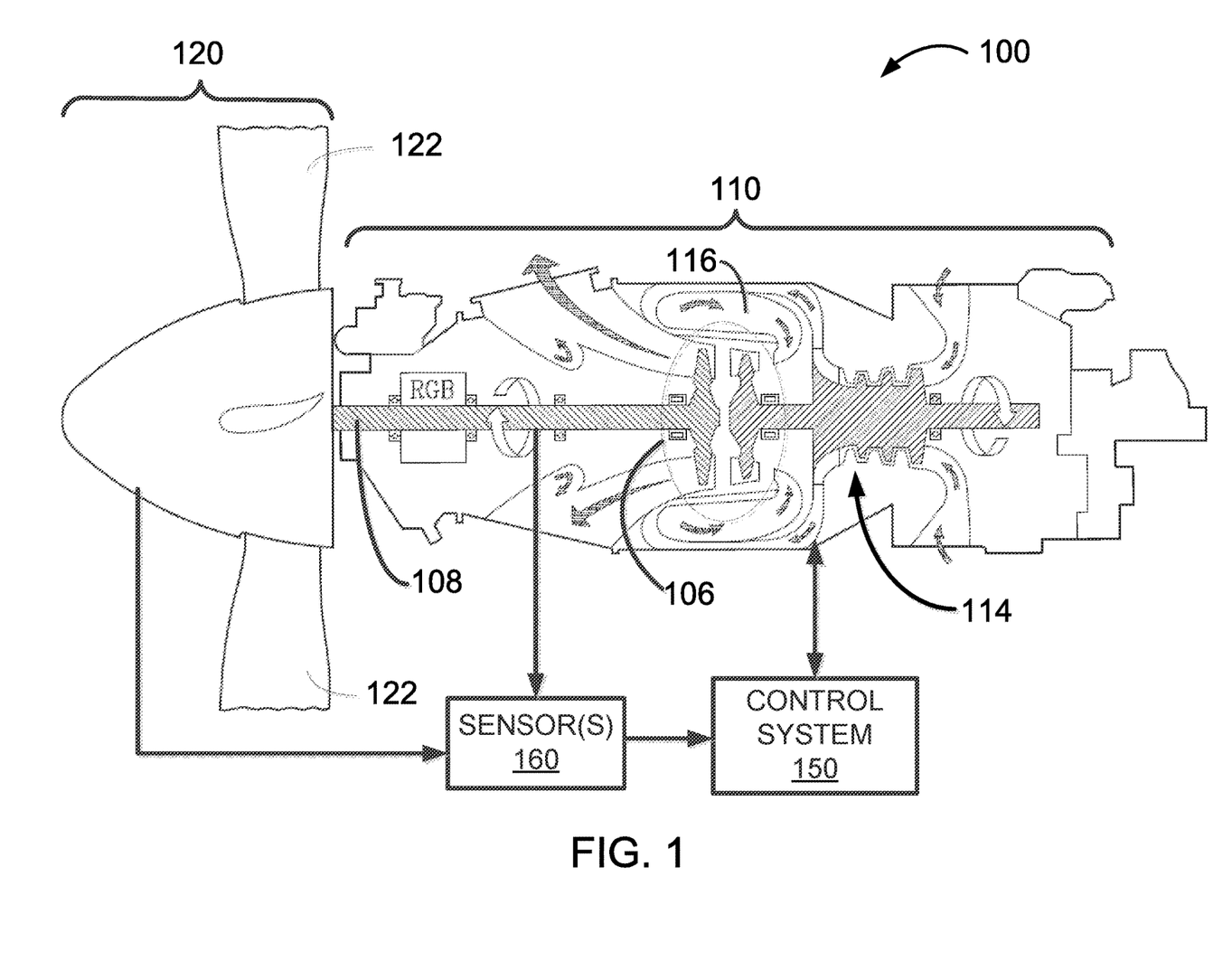
FIG. 1 is a schematic cross-sectional view of an example gas turbine engine.

FIG. 1 illustrates a power plant 100 for an aircraft of a type provided for use in subsonic flight, generally comprising an engine 110 and a propeller 120. The power plant 100 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from the shaft 108 of the engine 110 to provide propulsive force for the aircraft, also known as thrust. The propeller 120 comprises two or more propeller blades 122. A blade angle of the propeller blades 122 may be adjusted. The blade angle may be referred to as a beta angle, an angle of attack or a blade pitch. The power plant 100 may be implemented to comprise a single or multi-spool gas turbine engine, where the turbine section 106 is connected to the propeller 120 through a reduction gearbox (RGB).

Control of the operation of the power plant 100 and can be effected by one or more control systems, for example control system 150. The control system 150 may be a propeller control unit, an engine and propeller electronic control system, an engine controller, such as a Full Authority Digital Engine Control (FADEC), an Engine Electronic Control (EEC), an Engine Control Unit (ECU) or the like. One or more sensor(s) 160 may be coupled to the engine 110 and/or propeller 120 in order to provide the control system 150 with measured parameters for use in controlling the power plant 100. The sensor(s) 160 may comprise torque sensors to measure torque directly from the shaft 108 of the engine 110. The sensor(s) 160 may comprise speed sensors or accelerometers to measure speed/acceleration from the shaft 108 and/or to measure speed/acceleration of the propeller 120.

Figure 2:
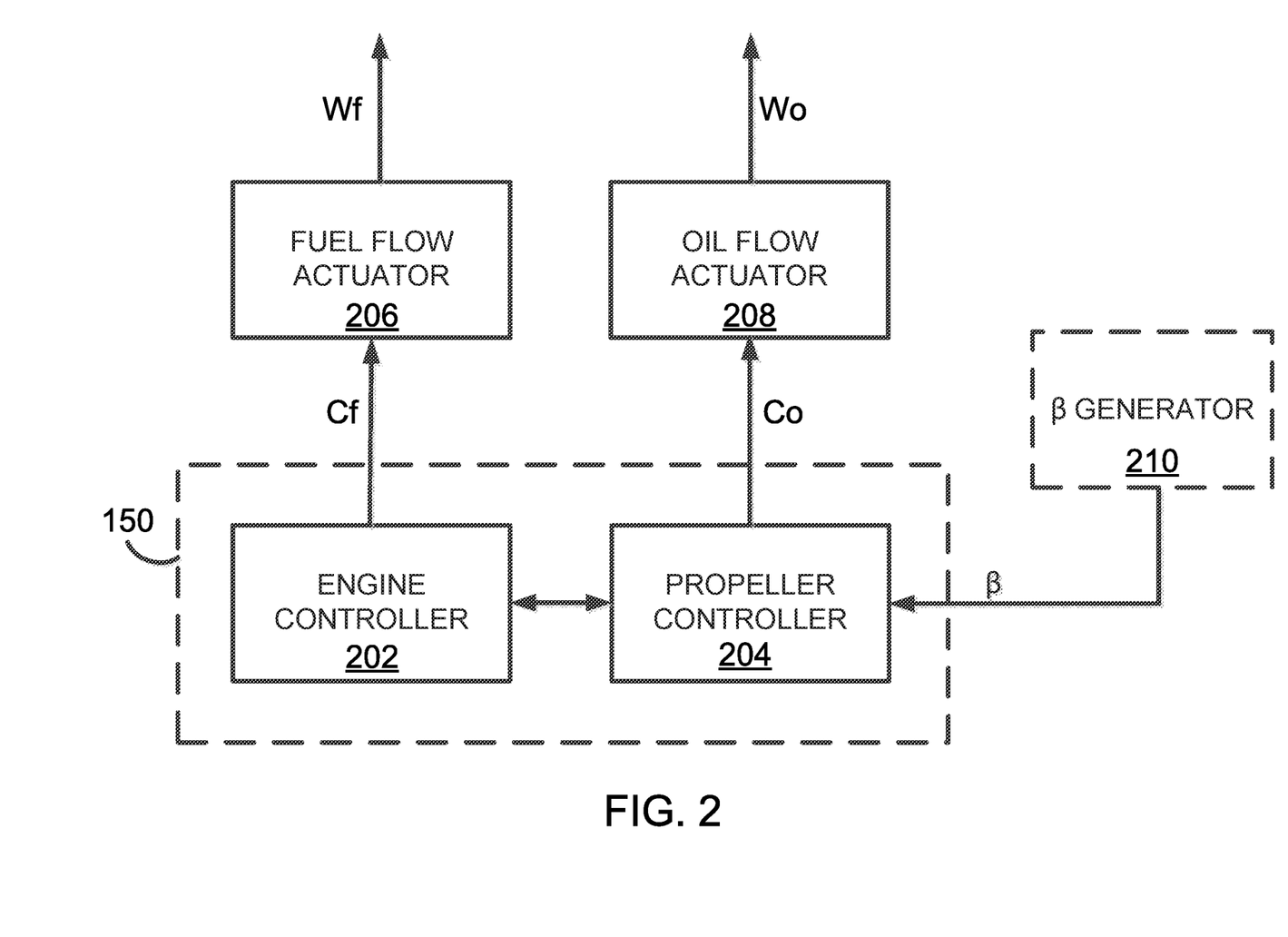
FIG. 2 is a block diagram of an example of the control system of FIG. 1.

Referring to FIG. 2, the control system 150 is shown to comprise an engine controller 202 and a propeller controller 204. Although illustrated as separate, the engine controller 202 and propeller controller 204 may together form a combined engine and propeller controller, such as an Engine & Propeller Electronic Control (EPEC). The engine controller 202 modulates fuel flow to the engine 110 in order to obtain a desired output power. A fuel flow actuator 206 receives a fuel flow command ($C_f$) from the engine controller and delivers fuel flow ($W_f$) to the engine 110 in accordance with the fuel flow command ($C_f$). Fuel flow control may be performed in an open-loop and/or closed-loop manner (i.e. with or without feedback from the engine 110).

The propeller controller 204 modulates oil flow to the propeller 120 in order to obtain a desired rotational speed. Rotational speed of the propeller is set via an angle of the blades 122. Fining the blade angle results in a propeller speed increase and coarsing the blade angle results in a propeller speed decrease. An oil flow actuator 208 receives an oil flow command ($C_o$) from the propeller controller 204 and delivers oil flow ($W_o$) to the propeller 120 in accordance with the oil flow command ($C_o$). The oil flow causes a change in propeller blade angle, which in turn affects the rotational speed of the propeller 120.

The actual or current propeller blade angle can be used determine the oil flow command ($C_o$). In some embodiments, the control system 150 is not provided with the capability of measuring the blade angle so as to provide a real-time feedback to the propeller controller 204. In some other embodiments, the propeller controller 240 cannot obtain the measured blade angle when the propeller 120 is in certain modes of operation, such as in forward operation. Accordingly, the propeller controller 204 is configured to operate based on a synthesized or estimated blade angle ($\beta$). The propeller controller 204 is designed to rely on an estimated or synthesized blade angle ($\beta$) to set the gain(s) of a control structure used to determine the oil flow command ($C_o$).

Figure 3:
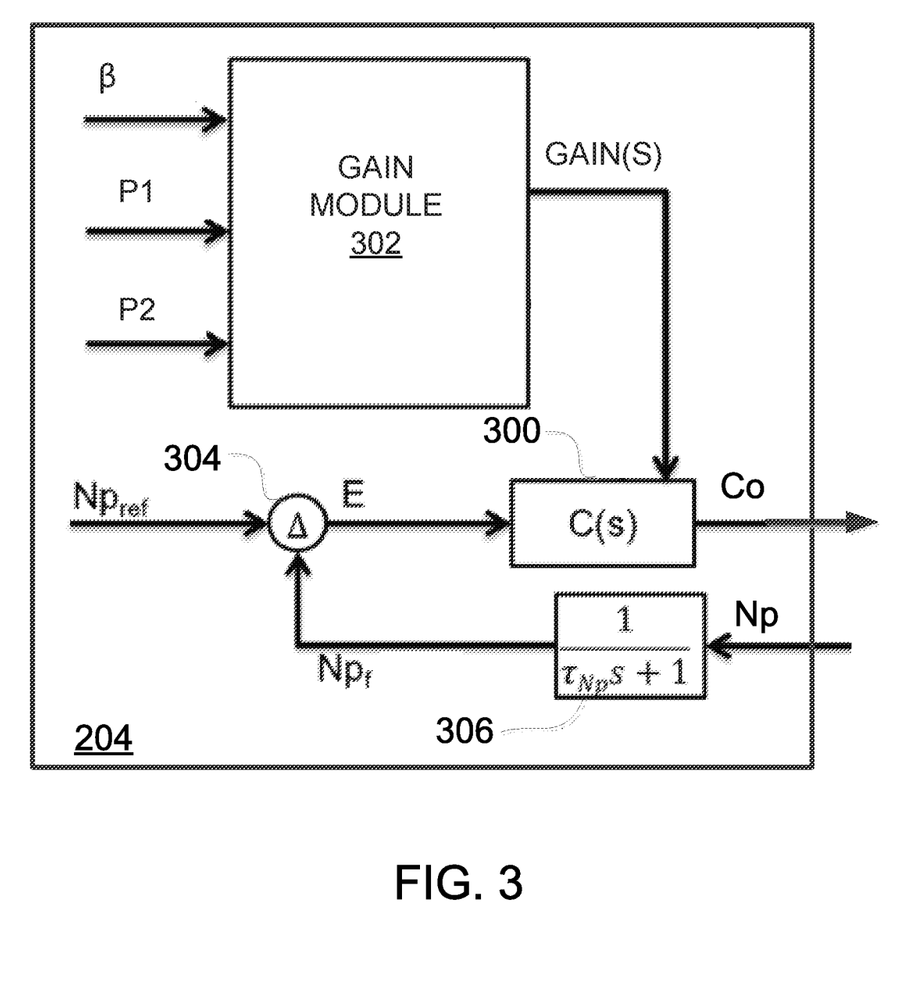
FIG. 3 is a block diagram of an example of the Beta generator of FIG. 2.

FIG. 3 illustrates an example embodiment of the propeller controller 204, which is designed as a feedback system. The feedback system may be electrical or electronic and is driven by a feedback controller 300. The feedback controller 300 may be implemented in various manners, for example through a single control mode of proportional, integral, or derivative. The feedback controller 300 may also be implemented using a combination of control modes, such as proportional-integral (PI), proportional-derivative (PD), and proportional-integral-derivative (PID). Other combinations are also possible, and it will be understood that other types of feedback controllers 300 may be used.

The gain(s) of the feedback controller 300 are set using the gain module 302, which takes as input the synthesized or estimated blade angle ($\beta$) and one or more other parameters (P1, P2, etc). For example, true airspeed and altitude of the aircraft may be used by the gain module 302 with the synthesized or estimated blade angle ($\beta$) to determine one or more gain required for the feedback controller 300 to generate the oil flow command ($C_o$). In some embodiments, the gain module 302 is a look-up table storing values determined using a model or transfer function derived for an operating point of the engine. The lookup table may be 2D, 3D, or any other suitable dimension depending on the number of input parameters used to determine the one or more gains for the feedback controller 300. Gains that are found to lead to a desired closed-loop behavior for a set of engine and/or aircraft parameters are stored in the lookup table. In some embodiments, the gain module 302 is configured to apply the model or transfer function upon receipt of the synthesized or estimated blade angle ($\beta$) and one or more other parameters in real-time, and output the corresponding gain(s).

The feedback system of the propeller controller 204 operates based on an actual propeller speed (Np), which may be received at the propeller controller 204 from a sensor 160 coupled to the propeller 120. In some embodiments, the propeller speed (Np) is calculated based on one or more other engine and/or aircraft parameters measured using the sensor(s) 160. The propeller speed (Np) may processed by a filter 306 to obtain a filtered propeller speed ($Np_f$). A comparator 304 compares the filtered propeller speed ($Np_f$) to a propeller reference speed ($Np_{ref}$), which may be predefined or set by a pilot of the aircraft or by any other mechanism for setting the propeller reference speed ($Np_{ref}$). The comparator 304 determines an error (E) representative of the difference between the filtered propeller speed ($Np_f$) and the propeller reference speed ($Np_{ref}$). The error (E) is sent to the feedback controller 300 which applies a function C(s) in order to generate the oil flow command ($C_o$). The function C(s) comprises the one or more gain as output by the gain module 302. The gains are applied in accordance with the control mode of the feedback controller 300. For example, if the feedback controller 300 is a PD controller, the gain module 302 outputs a proportional gain ($K_p$) and a derivative gain ($K_d$). The feedback controller 300 applies the proportional gain ($K_p$) as a multiplier to the error (E) and the derivative gain ($K_d$) as a multiplier to a derivative of the error (E) in accordance with the function C(s). The oil flow command ($C_o$) is then converted into the oil flow ($W_o$) by the oil flow actuator 208.

Referring back to FIG. 2, the synthesized or estimated blade angle ($\beta$) may be generated by a $\beta$ generator 210. In some embodiments, the synthesized or estimated blade angle ($\beta$) is generated offline (i.e. remotely), stored in a memory, and accessed or retrieved by the propeller controller 204 as needed. In some embodiments, the synthesized or estimated blade angle ($\beta$) is generated online (i.e. locally) when needed, and provided to the gain module 302. Although illustrated as separate from the propeller controller 204, the $\beta$ generator 210 may, in some embodiments, form part of the propeller controller 204.

Figure 4:
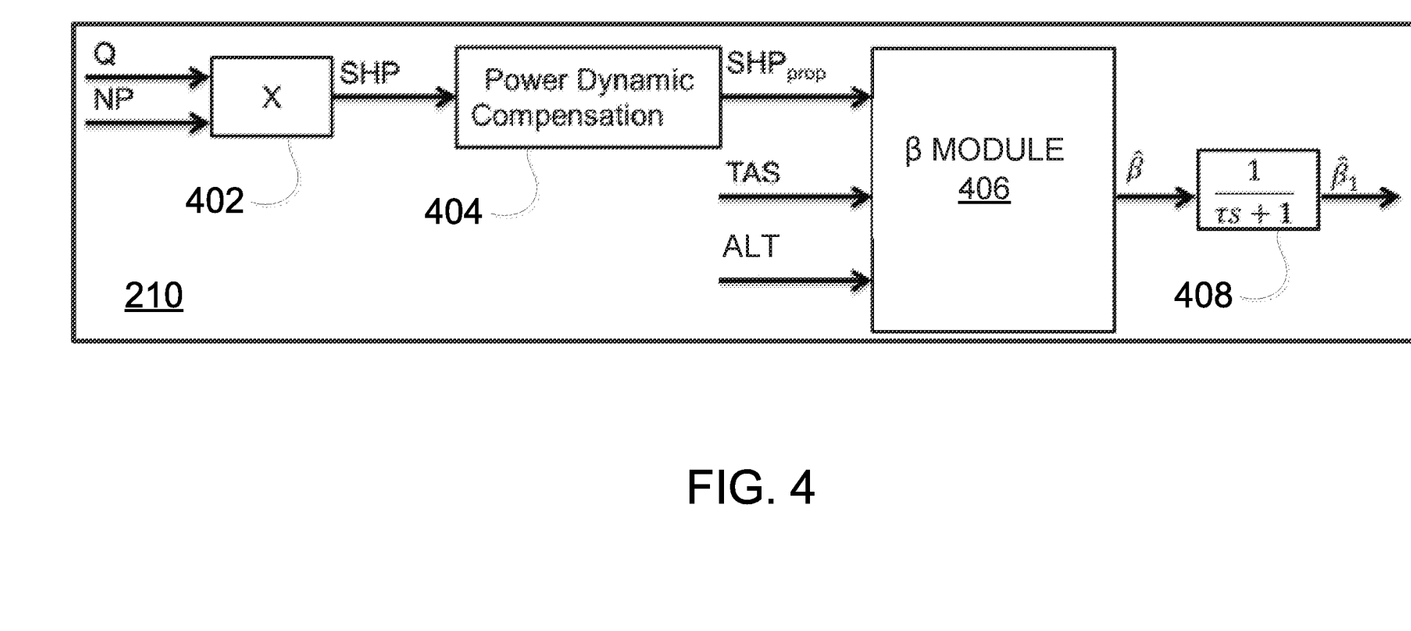
FIG. 4 is a block diagram of an example of the propeller controller of FIG. 2.

FIG. 4 illustrates an example embodiment of the $\beta$ generator 210. Propeller characteristics (sometimes referred to as propeller maps) form the basis of a $\beta$ module 406, which outputs a given $\beta$ value based on a set of engine and/or aircraft parameters. For example, in one embodiment the propeller characteristic is the capacity of the propeller to extract power from the engine as a function of ambient conditions (altitude, temperature, aircraft speed, etc) for a given blade angle. In another embodiment, the propeller characteristic may be the capability to convert power from the engine into thrust as a function of the ambient conditions (altitude, temperature, aircraft speed, etc.). Various engine and/or aircraft parameters that are measureable or directly available to the control system 150 may be used by the $\beta$ module 406 to determine the estimated or synthesized $\beta$. The $\beta$ value is estimated or synthesized based on all of the combinations of the input parameters. In some embodiments, the $\beta$ module 406 is a look-up table of N dimensions, depending on the number of input parameters. Alternatively, the $\beta$ module 406 applies a relationship between the input parameters in real-time in order to estimate or synthesize the blade angle. The relationship may be provided by an equation, function, or the like.

In the example of FIG. 4, the input parameters to the β module 406 are the shaft horse power (SHP), the airspeed of the aircraft (TAS), and the altitude of the aircraft (ALT) (which can be expressed as a ratio δ). Other parameters, such as outside air temperature, engine torque, gas-generator shaft speed of rotation, and engine inlet temperature may also be used. The shaft horsepower, which is essentially the output power of the engine, may be determined based on torque (Q) and propeller speed (Np) measurements (direct or indirect) provided to a multiplier 402. In some embodiments, a power dynamic compensation 404 is applied to the shaft horsepower to account for inertial effects on the output shaft. The inertia from the output shaft to the propeller is used to deduce what the power dissipated by the propeller would be, and the output power of the propeller ($SHP_{prop}$) is used as input parameter to the β module 406. Note that the power dynamic compensation 404 may be omitted and shaft horsepower may be directly input into the β module 406. In some embodiments, the power dynamic compensation may be performed in accordance with U.S. Patent Application Publication No. 2019-0155318, the contents of which are hereby incorporated by reference.

In some embodiments, the blade angle as output by the β module 406 is processed by a filter 408 in order to account for the reaction time of the feedback controller 300 in the propeller controller 204. The filter 408 may be a low-pass filter, but other types of filters may also be used. The resulting blade angle may be used to set the one or more gain of the feedback controller 300, as described above.

Figure 5:
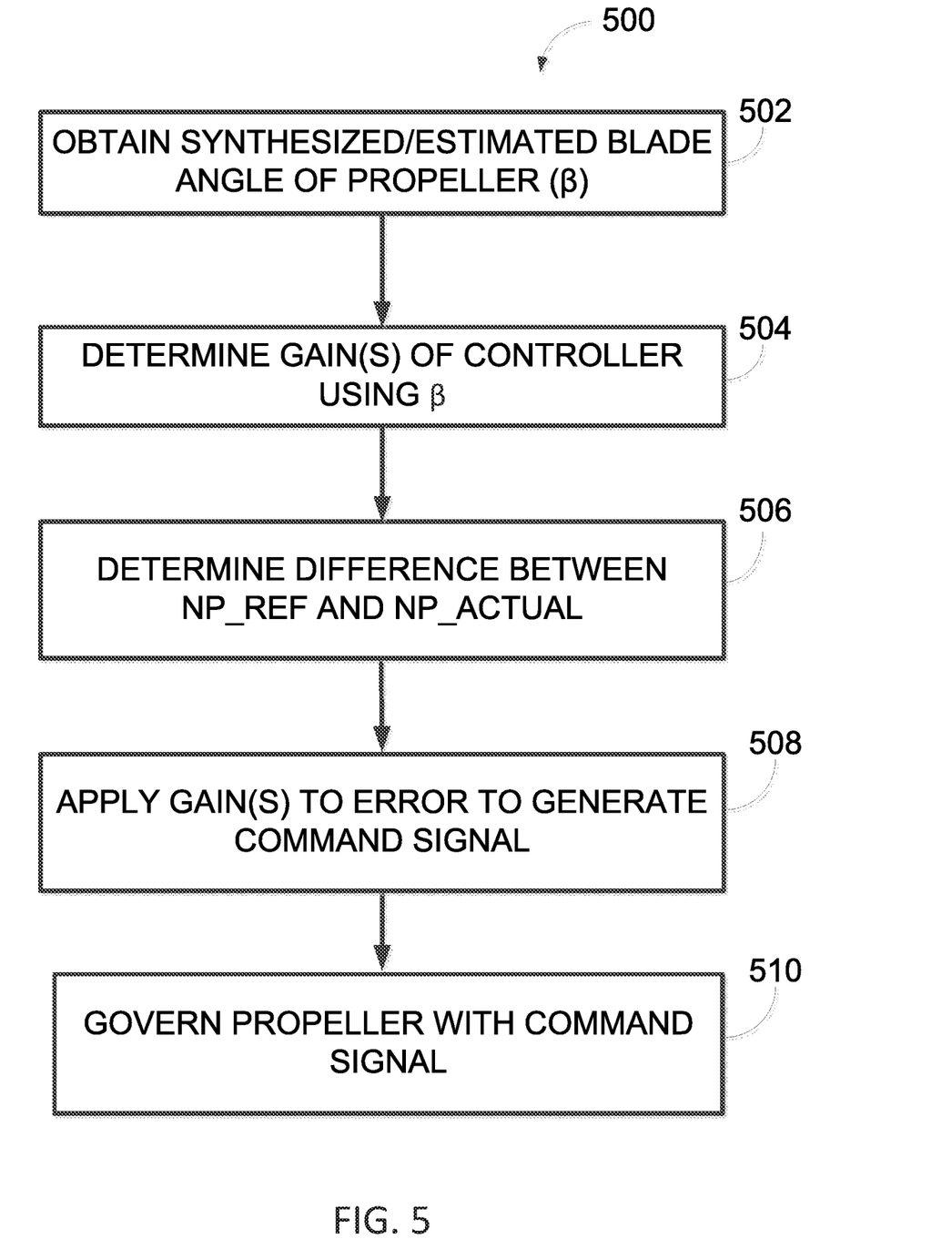
FIG. 5 is a flowchart of an example method for propeller speed governing.

Referring to FIG. 5, there is illustrated a method 500 for governing the speed of a propeller on a propeller-based engine, for example using the propeller controller 204 as described above. At step 502, the synthesized or estimated blade angle is received. In some embodiments, step 502 comprises accessing a memory or other storage medium where a plurality of synthesized or estimated blade angles are stored and selecting the appropriate or suitable synthesized or estimated blade angle based on a set of operating conditions of the engine and/or aircraft. In some embodiments, step 502 comprises receiving the synthesized or estimated blade angle from another engine and/or aircraft system. In other embodiments, step 502 comprises generating the synthesized or estimated blade angle from characteristics of the propeller and a set of operating conditions of the engine and/or aircraft.

At step 504, one or more gains are determined for a controller of the propeller using the synthesized or estimated blade angle and one or more engine and/or aircraft parameter. For example, gains for the feedback controller 300 may be determined using the gain module 302. In some embodiments, step 504 comprises inputting the synthesized or estimated blade angle and one or more engine and/or aircraft parameter into a lookup table and outputting a corresponding gain for the controller. In other embodiments, step 504 comprises generating the gain by applying a relationship between the input parameters, the synthesized or estimated blade angle, and the controller gains to obtain the gains.

At step 506, a difference between a reference propeller speed and an actual propeller speed (measured or calculated) is determined. The difference may be represented by an error, as described in the examples above. At step 508, the one or more gain as determined in step 504 is applied to the difference in order to generate a command signal for controlling the propeller. At step 510, the propeller is governed with the command signal.

In some embodiments, the method 500 comprises compensating for dynamic effects of the engine and/or propeller that may not be present under steady state conditions. For example, if torque (Q) is read from the shaft of the engine instead of from the propeller, a compensation may be applied to a value obtained based on the torque. In another example, if the relationships used to determine the blade angle is based on steady state estimates, a compensation may be applied to the blade angle value to account for reaction time of the system.

The method 500 aims to find a balance between performance and stability for propeller speed governing, in circumstances where a measured blade angle is not available. The synthesized or estimated blade angle is used to optimize the selection of feedback controller gains in order to achieve this balance. The method 500 may be implemented in any electronic propeller control system for a propeller-based engine, for controlling the aircraft propeller throughout the flight envelope, using signals that are available or may be acquired by the control system.

Figure 6:
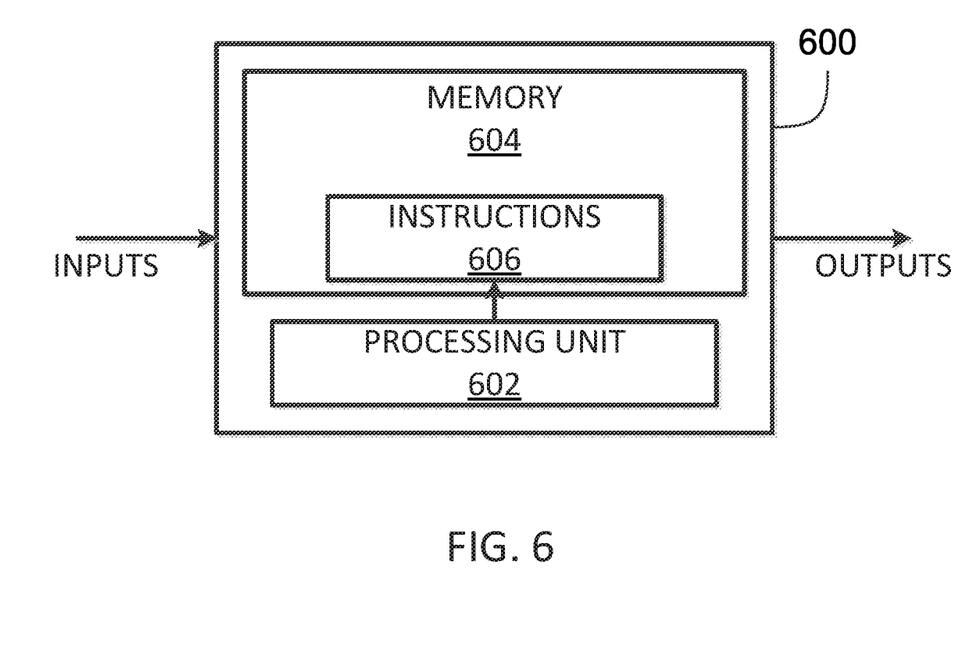
FIG. 6 is a block diagram of an example computing device for implementing the propeller controller of FIG. 2.

With reference to FIG. 6, the method 500 may be implemented by a computing device 600, comprising a processing unit 602 and a memory 604 which has stored therein computer-executable instructions 606. The processing unit 602 may comprise any suitable devices configured to implement the system such that instructions 606, when executed by the computing device 600 or other programmable apparatus, may cause the functions/acts/steps of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to a device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for governing the speed of a propeller described herein may be implemented in a high level procedural or object oriented programming or scripting language, or a combination thereof, to communicate with or assist in the operation of a computer system, for example the computing device 600. Alternatively, the methods and systems for governing the speed of a propeller may be implemented in assembly or machine language. The language may be a compiled or interpreted language. Program code for implementing the methods and systems for governing the speed of a propeller may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for governing the speed of a propeller may also be considered to be implemented by way of a non-transitory computer-readable storage medium having a computer program stored thereon. The computer program may comprise computer-readable instructions which cause a computer, or in some embodiments the processing unit 602 of the computing device 600, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, various combinations of the software and/or hardware components described herein may be used. Yet further modifications could be implemented by a person of ordinary skill in the art in view of the present disclosure, which modifications would be within the scope of the present technology.

The invention claimed is:

1. A method for governing a speed of a propeller on a propeller-based engine in an aircraft, the method comprising:
   determining a synthesized or estimated blade angle for the propeller of the engine as a function of one or more engine or aircraft parameters;
   determining one or more gains for a controller of the propeller based on the synthesized or estimated blade angle and the one or more engine or aircraft parameters;
   receiving a reference propeller speed and an actual propeller speed;
   determining a difference between the reference propeller speed and the actual propeller speed;
   applying the one or more gains to the difference via the controller in order to generate a command signal for controlling the propeller; and
   governing the propeller of the engine using the command signal.

2. The method of claim 1, wherein determining the synthesized or estimated blade angle comprises selecting the synthesized or estimated blade angle from a plurality of blade angle values in a lookup table as a function of the one or more engine or aircraft parameters.

3. The method of claim 1, wherein determining the synthesized or estimated blade angle comprises generating the synthesized or estimated blade angle from characteristics of the propeller and the one or more engine or aircraft parameters.

4. The method of claim 3, wherein determining the synthesized or estimated blade angle comprises inputting the one or more engine or aircraft parameters into a look-up table that maps the characteristics of the propeller to the one or more engine or aircraft parameters.

5. The method of claim 4, wherein the one or more engine or aircraft parameters comprise an engine output power, an aircraft true airspeed, and an aircraft altitude.

6. The method of claim 3, wherein determining the synthesized or estimated blade angle comprises applying a compensation to a calculated output power of the engine to determine power dissipated by the propeller, and using the power dissipated by the propeller as one of the one or more engine or aircraft parameters.

7. The method of claim 3, wherein determining the synthesized or estimated blade angle comprises emulating a reaction time of the controller by adding a time delay to the synthesized or estimated blade angle.

8. The method of claim 1, wherein determining one or more gains for a controller of the propeller comprises inputting the synthesized or estimated blade angle and the one or more engine or aircraft parameters into a lookup table and outputting the one or more gain for the controller.

9. The method of claim 1, wherein the one or more engine or aircraft parameters used with the synthesized or estimated blade angle to determine the one or more gains are an aircraft true airspeed and an aircraft altitude.

10. A system for governing speed of a propeller on a propeller-based engine in an aircraft, the system comprising:
    a processing unit; and
    a non-transitory computer readable medium having stored thereon program code executable by the processing unit for:
       determining a synthesized or estimated blade angle for the propeller of the engine as a function of one or more engine or aircraft parameters;
       determining one or more gains based on the synthesized or estimated blade angle and the one or more engine or aircraft parameters;
       receiving a reference propeller speed and an actual propeller speed;
       determining a difference between the reference propeller speed and the actual propeller speed;
       applying the one or more gains to the difference in order to generate a command signal for controlling the propeller; and
       governing the propeller of the engine using the command signal.

11. The system of claim 10, wherein determining synthesized or estimated blade angle comprises selecting the synthesized or estimated blade angle from a plurality of blade angle values in a lookup table as a function of the one or more engine or aircraft parameters.

12. The system of claim 10, wherein determining the synthesized or estimated blade angle comprises generating the synthesized or estimated blade angle from characteristics of the propeller and the one or more engine or aircraft parameters.

13. The system of claim 12, wherein determining the synthesized or estimated blade angle comprises inputting the one or more engine or aircraft parameters into a look-up table that maps the characteristics of the propeller to the one or more engine or aircraft parameters.

14. The system of claim 13, wherein the one or more engine or aircraft parameters comprise an engine output power, an aircraft true airspeed, and an aircraft altitude.

15. The system of claim 12, wherein determining the synthesized or estimated blade angle comprises applying a compensation to a calculated output power of the engine to determine power dissipated by the propeller, and using the power dissipated by the propeller as one of the one or more engine or aircraft parameters.

16. The system of claim 12, wherein determining the synthesized or estimated blade angle comprises emulating a reaction time of a controller of the propeller by adding a time delay to the synthesized or estimated blade angle.

17. The system of claim 10, wherein determining one or more gains for a controller of the propeller comprises inputting the synthesized or estimated blade angle and the one or more engine or aircraft parameters into a lookup table and outputting the one or more gains for the controller.

18. The system of claim 10, wherein the one or more engine or aircraft parameters used with the synthesized or estimated blade angle to determine the one or more gains are aircraft true airspeed and an aircraft altitude.

19. A non-transitory computer-readable medium having stored thereon program instructions executable by a processor for governing a speed of a propeller on a propeller-based engine in an aircraft, the program instructions configured for:

determining a synthesized or estimated blade angle for the propeller of the engine as a function of one or more engine or aircraft parameters;
determining one or more gains for a controller of the propeller based on the synthesized or estimated blade angle and the one or more engine or aircraft parameters;
receiving a reference propeller speed and an actual propeller speed;
determining a difference between the reference propellers speed and actual propeller speed;
applying the one or more gains to the difference via the controller in order to generate a command signal for controlling the propeller; and
governing the propeller of the engine using the command signal.

20. The non-transitory computer-readable medium of claim 19, wherein determining the synthesized or estimated blade angle comprises selecting the synthesized or estimated blade angle from a plurality of blade angle values from a lookup table as a function of the one or more engine or aircraft parameters.

* * * * *